July 4, 1967  B. L. CORSON  3,329,419
MOVING PALLET SINTERING APPARATUS AND METHOD
Filed Nov. 8, 1963  7 Sheets-Sheet 1

INVENTOR:
BOLTON L. CORSON
BY Howson & Howson
ATTYS.

INVENTOR:
BOLTON L. CORSON
BY *Howson & Howson*
ATTYS.

July 4, 1967   B. L. CORSON   3,329,419
MOVING PALLET SINTERING APPARATUS AND METHOD
Filed Nov. 8, 1963   7 Sheets-Sheet 6

INVENTOR:
BOLTON L. CORSON
BY Howson & Howson
ATTYS.

United States Patent Office 3,329,419
Patented July 4, 1967

3,329,419
MOVING PALLET SINTERING APPARATUS
AND METHOD
Bolton L. Corson, Chestnut Hill, Pa., assignor to G. &
W. H. Corson, Incorporated, Plymouth Meeting, Pa.,
a corporation of Delaware
Filed Nov. 8, 1963, Ser. No. 322,403
16 Claims. (Cl. 263—28)

This invention relates to apparatus for the handling and treatment of solid materials, particularly the heat treatment of masses of sinterable solid material. It is especially concerned with apparatus suitable for use in the production of sintered lightweight aggregate for use in concrete.

Machines for sintering a mixture of a granular material and powdered solid fuel to provide a sinter cake are well known. Such sintering machines fall into three major classes, namely, the stationary grate, the rotating grade and the rotary kiln types.

Typical stationary grate type apparatus comprises a plurality of grates supported by a suction box. An air pipe is connected to the suction box and is attached to a fan which draws air downwardly through the grates. A layer comprising a mixture of granular material and powdered fuel is placed on the grates and the fuel in the upper layers is ignited by means of an ignition furnace. The ignition furnace is shut off and combustion of fuel in the charge progresses downwardly through the charge due to the downward flow of air. When sintering is completed, the resulting sinter cake is removed from the grates by tilting the grates and associated suction box.

Stationary sintering devices similar to that described above have a number of disadvantages, one of course residing in the fact that the apparatus is suitable for batch operation only, and thus during dumping of the sintered material and recharging of the grates there are considerable periods of time when the apparatus is not in operation. In addition, the downward draft of the hot combustion gases through the grates requires the use of relatively heavy and expensive grates which must be replaced at frequent intervals.

The conventional traveling grate sintering machine has become known as the "Dwight-Lloyd" type. This form of sintering apparatus comprises an endless array of gas-permeable grates attached to a pair of chains, which array is mechanically advanced by power driven sprockets. Apparatus of this general type is provided with a chute for discharging a mixture of granular material and powdered solid fuel onto the traveling grates, and with a wind box which is ordinarily located immediately beneath the upper horizontal path taken by the grates and which draws air downwardly through the grates. In apparatus of this type, charge is placed beneath an ignition chamber where the solid fuel in the upper layer of material is ignited by means of a flame resulting from combustion of the solid fuel. Sintering then takes place by combustion of the solid fuel of the charge, the hot gases from the upper layers igniting the fuel in the lower layers so that the burning passes downwardly through the bed.

Although apparatus of the "Dwight-Lloyd" type may be run continuously, which is preferable to batch operation, nevertheless, the apparatus has proved to be considerable troublesome in operation. For example, where a down draft is used to cause combustion of the fuel in the charge, the grates are subjected to greatly elevated temperatures and in a relatively short period of time burn out, requiring a shutdown of the apparatus. The grates, because they are subjected to considerable heat, must be very bulky and heavy, and thus are costly to replace. Furthermore, because the grates must be of heavy construction to give them some period of useful life, the mechanism for advancing the grates is ordinarily very large and expensive.

A variation in the traveling grate type apparatus involves the use of separate pallets which travel about a continuous track having an upper horizontal run and a lower sloping run. The pallets are advanced as a train in end-abutting relation over a suction boss in the upper run by means of a pair of gears. Upon reaching the end of the upper run each pallet travels by gravity to and along the lower run where it is returned to the upper run by the pair of gears. In addition to having the disadvantages of down-draft burning described above, the pallets frequently do not register with the teeth in the elevating gears causing breakdown of the apparatus. Costly repairs are frequently incurred in again placing the apparatus in running condition.

A further variation of the traveling grate type apparatus involves up-draft sintering as described in United States Patent No. 2,895,818, issued July 21, 1959. The system referred to as "prior art" in this patent has the various disadvantages set forth therein. Both the "prior art" system and that to which the patent is specifically directed have the disadvantage that a separate fuel layer is ignited by a downward application of heat, and then cold, moist, fragile nodules are suddenly dropped on top of the ignited layer. The cold, moist, fragile nodules tend to extinguish the ignited bottom layer unless it is heated to extremely high temperature. Such heating may substantially increase the cost of the operation. Furthermore, the cold fragile nodules tend to disintegrate upon hitting the ignited layer, and disintegrated particles tend to clog the interstices of the mass and cause uneven and incomplete sintering.

An additional disadvantage of the apparatus disclosed in Patent No. 2,895,818 is that the conveyors and feeders are expensive to install and maintain and they are subject to the hot gases arising off the bed of material.

The rotary kiln type of apparatus is costly from the view points of initial cost, maintenance cost and fuel cost. It is also not possible in a rotary kiln to sinter fragile nodules and have them retain their original shape and, therefore, the resultant product does not have the superior shape characteristics of applicant's invention.

A primary object of the invention is to provide apparatus for supporting and moving a mixture of granular material and powdered soild fuel through an ignition zone to ignite the fuel in the bottom layer of the mixture and thereafter moving the mixture over a plurality of wind boxes maintained at superatmospheric pressure to develop upward movement of combustion-supporting gas through the material to cause combustion of the fuel to progress upwardly through the material, whereby those portions of the apparatus for supporting the material are not subjected to temperature which will cause damage.

Another primary object of this invention is to provide continuous sintering apparatus of relatively light weight, inexpensive construction wherein individual pallets are employed to support the material to be treated and the pallets are circulated through a treating zone, tilted to discharge treated material and return to be refilled with material to be treated by relatively simple mechanism which is not subject to jamming or other troublesome causes of breakdown which have plagued prior known continuous sintering apparatus.

A further object is to provide a novel method for sintering a mixture of granular material and powdered solid fuel wherein combustion of the fuel in a layer of said mixture is caused to progress upwardly through said layer following ignition of fuel at the bottom of said layer.

Another object is to provide a method for sintering shaped bodies, such as fragile nodules, formed of sinterable aggregate body material and fuel for combustion during sintering, by causing combustion in a bed of such bodies to progress upwardly through said bed following ignition of the fuel in the bodies forming the bottom layer of said bed, whereby the sintered product comprises hard light-weight bodies, easily separable one from the other, and particularly suitable for use as light-weight aggregate in concrete and the like.

A further object of the invention is to provide improved handling apparatus for grate pallets.

Still another object of the invention is to provide separate relatively small, simple, light-weight grate pallets which are inexpensive to build and maintain.

A still further object is to provide an improved form of grate for pallets.

It is also an object to provide an apparatus and method capable of achieving the foregoing objects in a manner which is inexpensive, simple and results in a more uniform and generally superior product.

In accordance with the invention the above objects are achieved in the following manner. The material to be treated is preferably loaded at a first position onto a train of end-abutting open-ended pallets supported for motion on a lower run of an endless track. The train of pallets is advanced on the track through a treatment zone to a second position, preferably by engaging and urging forward the last pallet of the train. Each pallet on reaching said second position is removed from the front of the train and returned in line at the rear of the train for sequential engagement and urging forward, thereby to maintain a continuous forward-moving train of pallets between the first and second positions. A reciprocating drive engaging a pallet at the end of the train during one direction of reciprocation is operative to provide advancement of the train. At said second position the forwardmost pallet of the train is engaged by a lifing member which separates the latter pallet from the train, lifts it, tilts it to discharge material therein through an open end thereof, and delivers the pallet to a second run of track disposed higher than said first run of track. Preferably, means are provided for advancing the separated pallets along the second, higher run of track to a third, downwardly-extending run of track down which the pallets may move by gravity into position at the rear of the train. Preferably the lifting means comprises a rotatable arm arrangement pivoted from above said second position, which engages each pallet at said second position and urges it along a fourth ascending run of track connecting with said second higher run of track. Switch means are preferably provided to operate the lifting arm arrangement in response to attainment by one of said pallets of said second position.

The pallets, which are preferably generally U-shaped, preferably slide along said first run of track, and each contains a generally horizontal grate on which the load to be treated is deposited. Further in accordance with the invention each grate comprises grate members which are tapered upwardly and inwardly toward the load from an intermediate portion of maximum thickness, and which extend downwardly from said intermediate portion, the downwardly-extending portions preferably being tapered inwardly.

In application of the invention to heat treatment such as sintering, the pallets bearing a layer comprising a mixture of granular material and fuel for consumption during heat treatment first pass through an ignition zone. In the ignition zone ignition of the fuel at the bottom of the layer is obtained in a unique and novel manner. More particularly, such ignition is obtained by supplying upwardly through the perforate bottom of the pallets a combustion-supporting gas, such as air, and by periodically heating the bottom of said layer. The heating can be accomplished by passing the pallets over a plurality of spaced burners. In passing over the burners hot combustion gases therefrom pass upwardly through the perforate bottom of the pallets and ignite the fuel at the bottom of the layer of material. The perforate bottom of the pallets are also heated in the ignition zone but not sufficiently to damage them. The pallets then move through a region in which a combustion-supporting gas, such as air, is applied under pressure to the undersides of the pallets to maintain the combustion required for sintering, which typically takes place at about 1800° F., the burning zone moving upwardly through the sinterable mass to complete the sintering before the pallets reach the second position at which they are lifted and dumped.

Due to the above-described shape of the grate members, cooperating with the use of an upwardly-flowing, combustion-supporting gas after initial upward ignition, complete, uniform sintering is obtained without damage to the grates. More particularly, the hot gases from the sintering material are caused to flow upwardly away from the grate and the grates are further cooled by the flow of the cool combustion-supporting gas. The channels formed between adjacent lower portions of the grate members also produce a warming of the combustion-supporting gas as it flows through them. The upwardly-tapered top portions of the grate members, which preferably taper to substantially zero thickness at their tops, permits the combustion-supporting gas to flow upwardly through substantially all lateral portions of the mass of sinterable material, producing uniform heating and sintering thereof.

Accordingly there is provided a simple, reliable and inexpensive apparatus and method for large-scale handling and treatment of sinterable solid materials, which is especially effective to produce uniform sintering of masses of shaped sinterable bodies, with minimum use of combustible gas and without damage to the grates supporting the sinterable material.

The above and other objects of the invention, as well as various features of novelty and advantages, will be apparent from the following description of an exemplary embodiment thereof, reference being made to the accompanying drawings, wherein.

Figures 1, 2, 3:
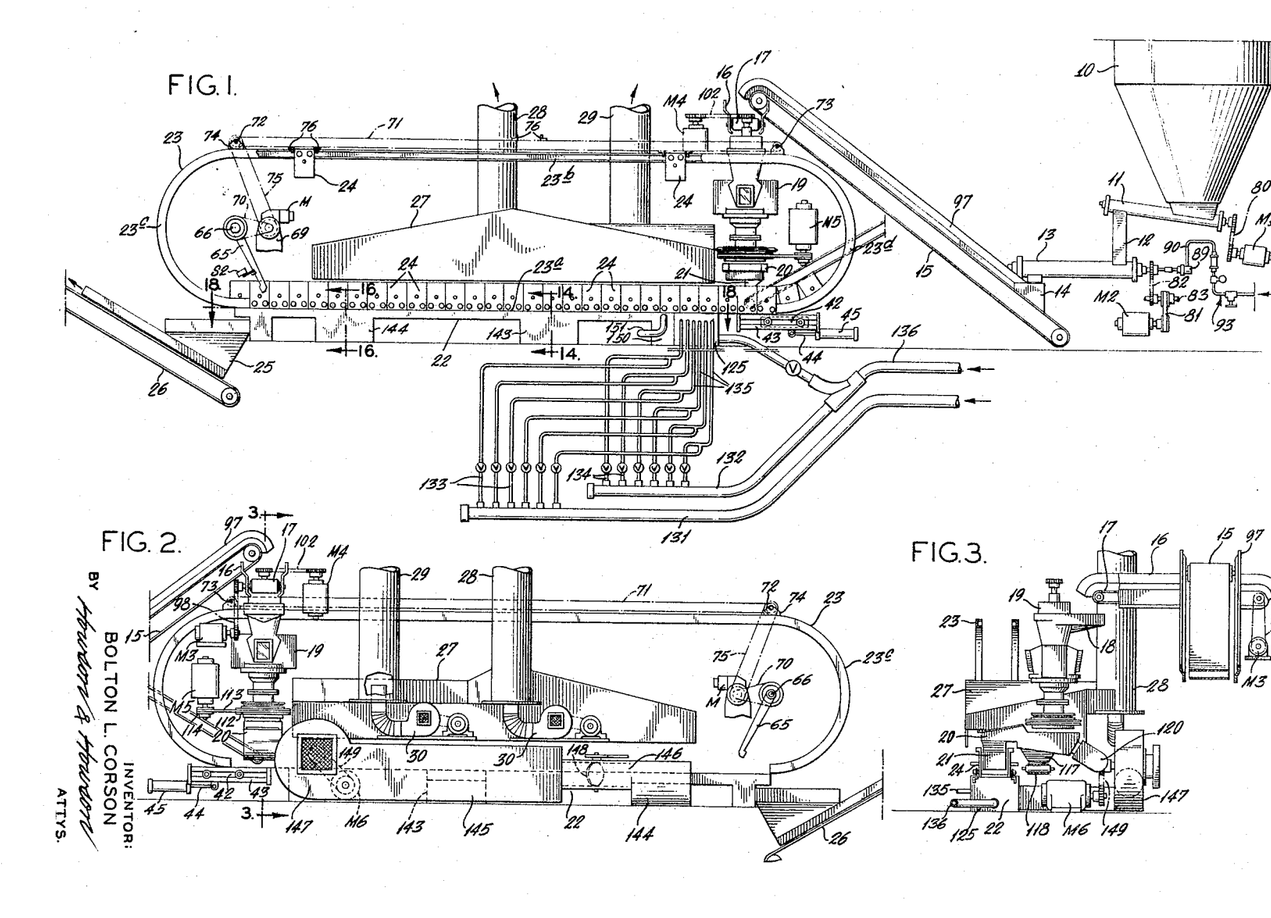
FIG. 1 is a side elevation, partly schematic, showing exemplary apparatus embodying the invention.
FIG. 2 is a side elevation of part of the apparatus shown in FIG. 1 but seen from the opposite side.
FIG. 3 is a transverse end elevation, partly in section on the line 3—3 of FIG. 2.

In broad general outline, the apparatus shown in FIGS. 1–3 comprises a supply bin 10 for preliminarily mixed materials, such as fly ash, powdered coal (if needed), and earthen material, such as clay etc.; a screw conveyor 11 for conveying material fed from the bin to a chute pipe 12; a screw paddle type of mixer or agglomerator 13 receiving material from chute 12 and delivering a wet mixture to a hopper 14; an elevating belt conveyor 15 taking wet-mixed material from the hopper 14 and delivering it to a transverse trough 16; a transverse belt conveyor 17 for moving material along the trough 16 and delivering it into a funnel or hopper 18; a pelletizer or nodule forming device 19 which squeezes and compacts the material and feeds the pellets down upon a lateral transfer device 20 which feeds them down a spout 21; sintering apparatus 22 including a vertical loop trackway 23 along which travel a plurality of grate pallets 24 from the charging spout 21 to a discharge hopper 25; and a delivery elevating belt conveyor 26. A hood 27 and stacks 28, 29 remove hot exhaust combustion gases from the sintering zone, motor operated blowers 30 aiding in the gas removal.

Figure 4:
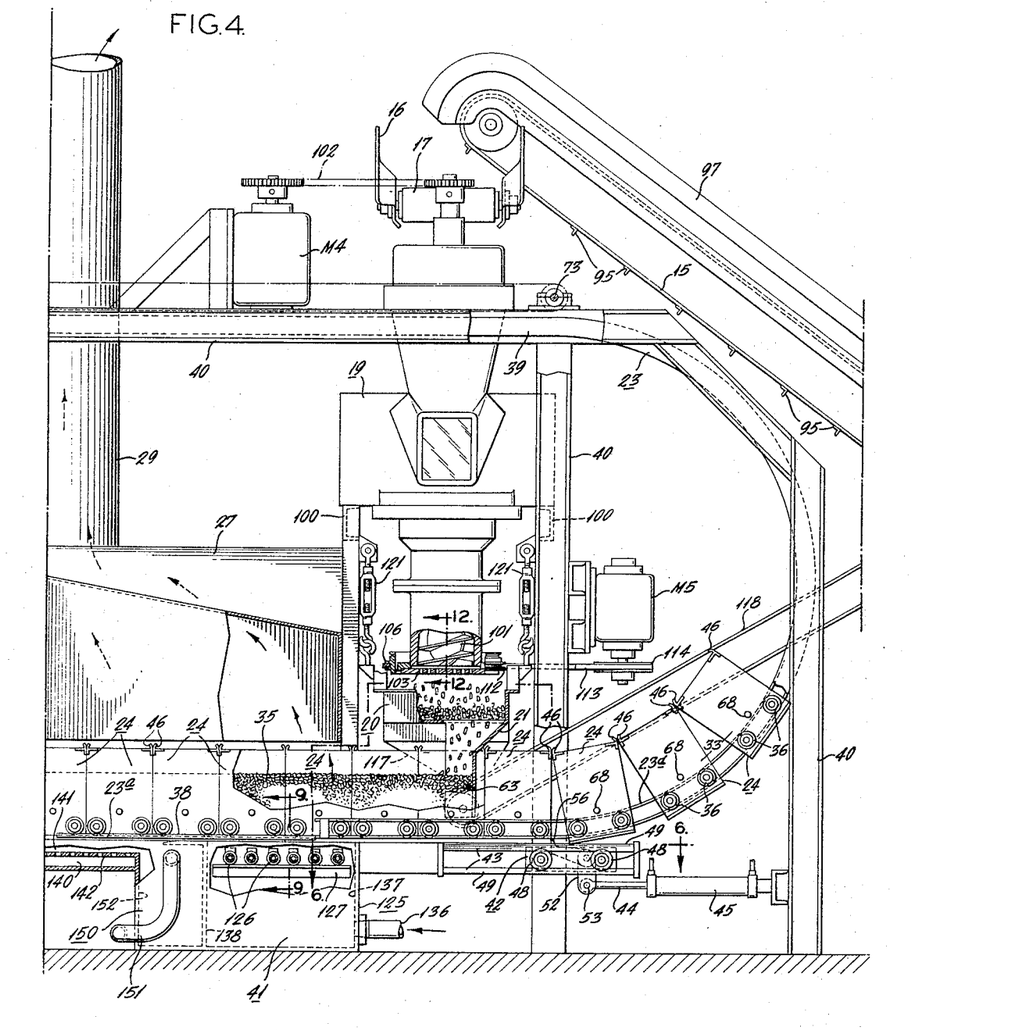
FIG. 4 is a partial enlarged side elevation and section of parts seen at the mid-right portion of FIG. 1.
Figures 5, 20, 21, 22:
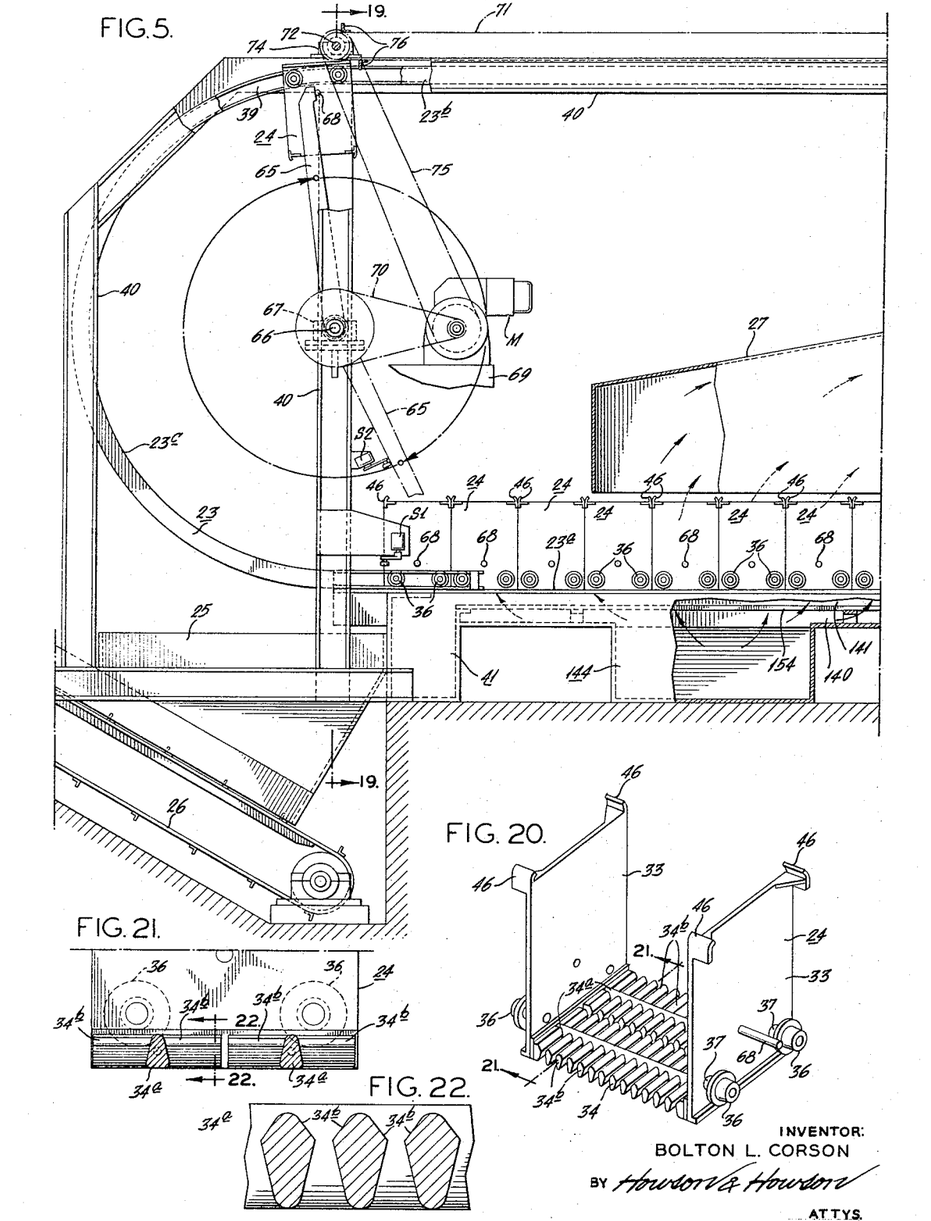
FIG. 5 is a partial enlarged side elevation and section of parts seen at the left portion of FIG. 1.
FIG. 20 is a perspective view of a grate unit or pallet.
FIG. 21 is an enlarged longitudinal vertical section taken on the line 21—21 of FIG. 20.
FIG. 22 is an enlarged transverse vertical section taken on the line 22—22 of FIG. 21.

In more detail, the grate pallets 24, as best shown in FIG. 20, are U-shaped devices with upstanding sides 33 and a grate bottom 34, the top being open for receiving charged material and the ends being open so that when the grate pallets are in their operative or use position, as best shown in FIG. 4, they are disposed in a continuous end-abutting line to support a continuous bed 35 of pellets while being sintered.

On the sides 33 the grate pallets 24 are provided with small flanged wheels or rollers 36 supported on stub shafts 37 projecting rigidly from the sides 33. The flanged wheels 36 support the grate pallets for guided movement along the trackway 23, or at least parts of it.

The trackway 23 comprises two types of rails, normal simple track rails 38, which may be plates, carried on suitable supports in the sintering zone and channel-shaped rails 39 supported by framework 40 at other places. The trackway 23 is in the general shape of a vertical oval with a bottom run 23a through the sintering zone, a generally parallel upper return run 23b and semi-circular connecting end runs 23c and 23d. The open sides of the spaced channel-shaped rails 39 face inwardly toward each other and support the wheels 36 in any position of the grate pallets therealong.

Figure 9:
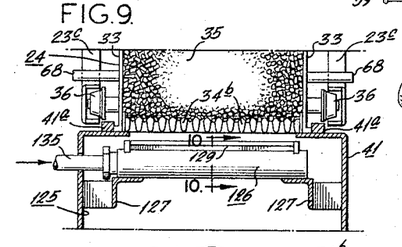
FIG. 9 is a partial enlarged transverse vertical section taken on the line 9—9 of FIG. 4.

At the bottom run 23a, as shown in FIGS. 4 and 9, the grate pallets are supported directly for sliding movement along plate flanges of base supports 41 between side guides 41a and are pushed forward by a power operated pusher device 42, here shown as a reciprocatory unit or carriage movable along fixed guides 43 and operated by the piston rod 44 of a power fluid cylinder 45 secured to the main frame 40 which supports the trackway and other parts of the apparatus.

At the entry end along the curved run 23d of the trackway the grate pallets slide down by gravity, and to prevent jamming or damage when one pallet strikes or rides against another as shown in FIG. 4, the upper end corners of the sides 33 are provided with substantial lugs 46 having curved interengaging faces. FIG. 20 shows these lugs in detail.

As shown in FIGS. 4, 6, 7 and 8, the pusher frame 42 is provided with stub shafts 47 carrying grooved wheels or rollers 48 riding on V-shaped rails 49 of the guides 43. A transverse shaft 50 is carried by the frame 42 and at the center has secured fast thereto, as by a pin 51, a depending arm 52 to which the piston rod 44 is connected, as by a pivot pin 53. Toward its ends the shaft 50 has secured thereto, as by pins 54, a pair of pusher arms 55 having upstanding finger ends 56 adapted to engage behind the lower ends of the rear edges of the sides 33 of a pallet. Springs 57 carried on headed guide pins 58 mounted in holes of a bracket 59 of the pusher carriage and a bracket 60 of arms 55 urge the arms 55 upward toward pallet engaging position.

It will be evident that when the piston rod 44 moves forward it first moves the arms 55 and their fingers 56 upward, the springs 57 assisting, until the slack in the headed pins 58 is taken up. This causes the fingers 56 to engage behind a pallet. Further movement of the piston rod pushes the pallet forward the required distance for feeding one pallet, the distance being shown in FIGS. 7 and 8.

The pusher moves pallets forward one-by-one into loading position as required and serves as the timing mechanism for the sintering apparatus. In different applications there may be considerable differences in the time for which material should remain in the sintering zone; and the timing control, which can readily be applied to the pallet pusher mechanism, furnishes a convenient arrangement for varying the time cycle. The kind of material, the size of the pellets, the amount of moisture, the amount and type of fuel content in the pellets, the depth of the fuel bed, the velocity of combustion-supporting air and various other considerations can influence the time needed for a bed of material to travel through the sintering zone.

When the piston rod retracts it lowers the arm 55 and fingers 56 below the bottom of the next pallet—which moves forward due to the gravity push of the pallets which follow—ready for engagement behind the next pallet on the next forward push. The number of pallets on the semi-circular return run 23d of the trackway 23 will determine the gravity push effect but the frictional resistance to sliding movement of the pallets along the run 23a of the trackway prevents forward movement except by the pusher. It is preferred that the end run 23d be kept almost filled with pallets so that the next pallet entering from above will not have a great distance to fall.

The bed of material 35 at the charging end at the spout 21 is confined by a downwardly-projecting extension plate 63 which extends into the space between the sides 33 of the pallets, as shown in FIG. 4.

Figures 12, 13, 19:
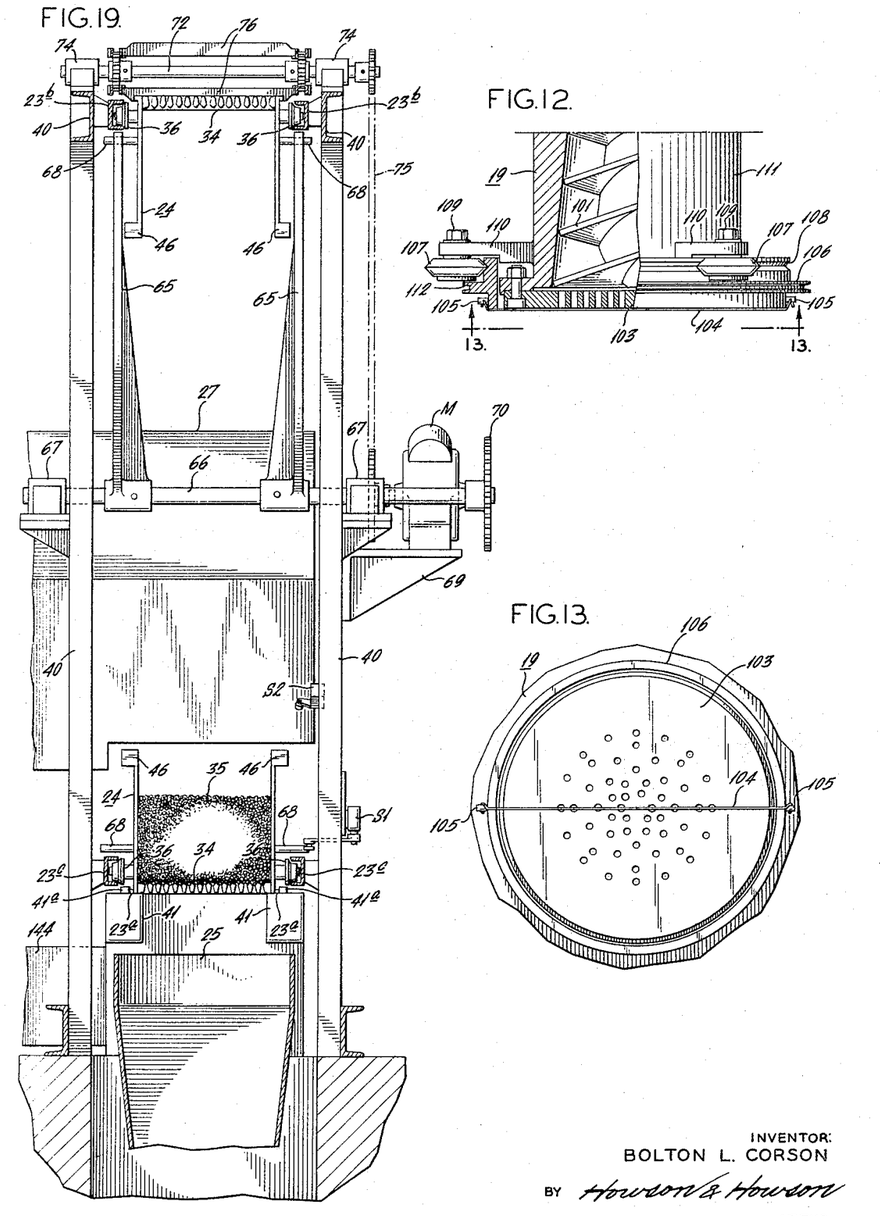
FIG. 12 is a partial enlarged section taken on the line 12—12 of FIG. 4 showing the lower end of a pelletizing machine.
FIG. 13 is a bottom plan view taken on the line 13—13 of FIG. 12.
FIG. 19 is an enlarged transverse vertical section and elevation taken on the line 19—19 of FIG. 5.

At the discharge end, as shown in FIGS. 5 and 19, the pallets are moved from the run 23a, up and around over the run 23c, and are left on the top run 23b by the rapid single continuous movement of a pair of long swinging arms 65 mounted on a transverse shaft 66 turnable in bearings 67 carried by the main frame 40. The sides 33 of the pallets are provided with laterally-projecting pins 68 adapted to be engaged by the arms 65 as they swing around.

When the line of pallets on the lower run 23a is pushed forward, the forward pallet in the line is moved away from the sintering zone and out over the discharge hopper 25. As it passes, the end of one of the projections 68 or other convenient part on the pallet engages the roller of the operating arm of a switch S1 of the control circuit of a motor M to start it. The motor is mounted on a bracket 69 fast on the main frame and is connected by a sprocket chain 70 and suitable sprockets to drive the shaft 66. The shaft is turned to carry the arms 65—and with them the pallet—upward and around through about 180 degrees until the pallet is supported on the upper run 23b of the trackway.

As the end pallet moves away from the next in line, some of the bed of sintered material between them will fall down into the hopper 25; and as the pallet moves up on the curved run 23c of the trackway it shifts position to cause all of the sintered material to be dumped from it into the hopper 25.

Above the top run 23b of the trackway there is provided on each side a chain conveyor belt 71 supported on sprockets on spaced transverse shafts 72 and 73 mounted in suitable bearings 74 on the main frame 40. The shaft 73 through suitable sprockets and a sprocket chain 75 is driven by the motor M in a direction to move the lower span of the chains in a direction from the discharge end toward the charging end. The chains 71 move at about the same speed as the speed of the end of the arms 65 and carry projections 76 adapted to embracingly engage the pallet on the front and rear ends when it is moved into position between them by the arms.

After the arms have deposited the pallet on the top run 23b they continue to turn until a lateral pin 77 on one of them engages the operator of a limit switch S2 which when actuated will de-energize the motor M. The motor will stop (being equipped with a magnet brake, if necessary) and halt the arms in proper position for the start of a succeeding movement to transfer the next pallet. The belts 71 will move each time the arms move and will shift the pallets along in stages until they drop off on the return run 23d.

It will be seen that a gravity return along the run 23b might be used instead of the conveyor belts 71, but the belts provide better control.

The sintering zone and operations therein will need further explanation, but before starting this explanation it will be helpful to explain some details which were deferred in the general explanation of the plant. Returning to the beginning, the screw conveyor 11 is driven by a motor M1 through a sprocket chain 80 and suitable sprockets. This motor and conveyor may operate continuously but it will be understood that this and other equipment in the line of supply may be halted automatically if conditions arise where material is not needed or when the supply is exhausted or when it is desired to shut down plant operations.

The paddle mixer 13 is driven by a motor M2 through a belt 81, a sprocket chain 82, an intermediate shaft 83, and suitable pulleys and sprockets. The interposition of the intermediate shaft 83 relates to operations which need not be considered in connection with the present invention.

Figures 23, 24:
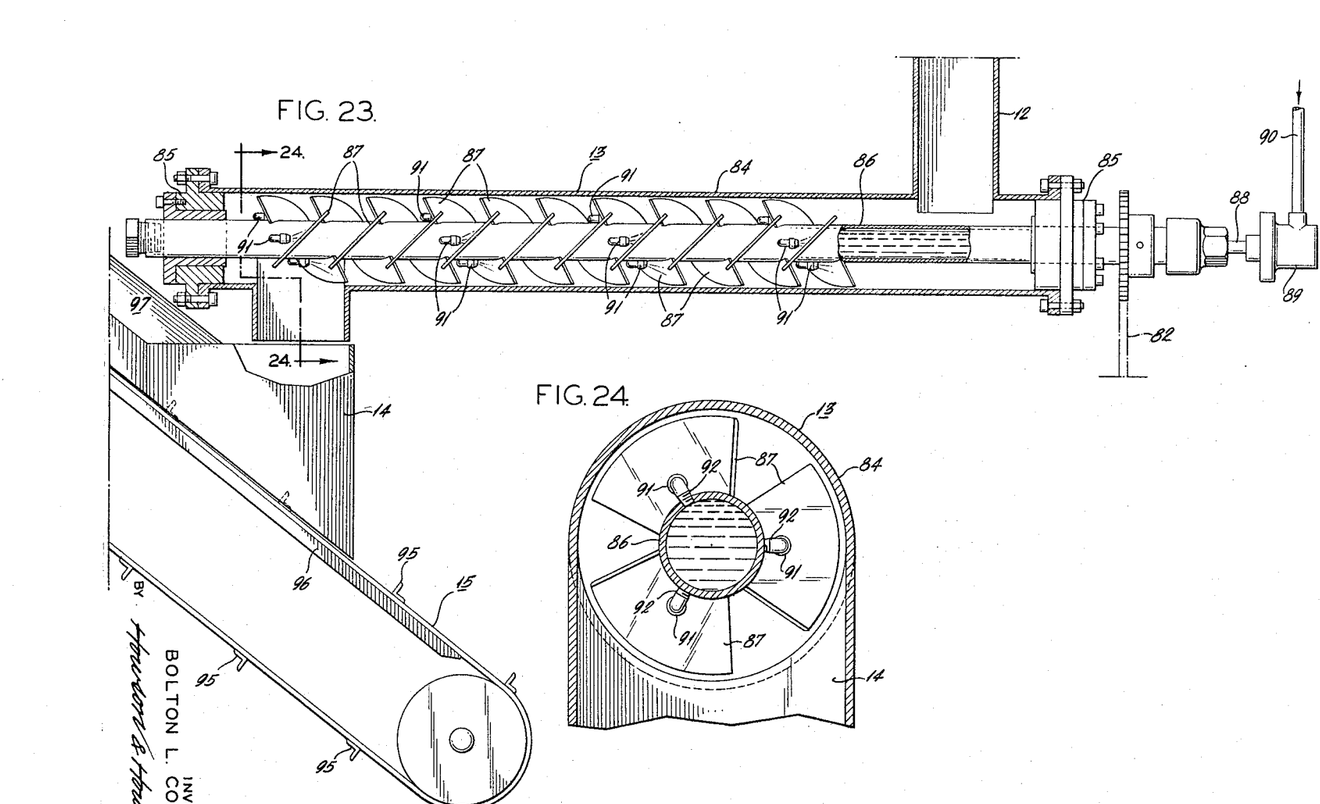
FIG. 23 is an enlarged vertical longitudinal section of a mixing or agglomerating unit seen in FIG. 1.
FIG. 24 is an enlarged vertical transverse section taken on the line 24—24 of FIG. 23.

The mixer 13 is shown in more detail in FIGS. 23 and 24. Here it is seen that the outer cylinder 84 has at its ends suitable bearings 85 for a hollow shaft 86 which carries blades 87. Water is supplied into the hollow shaft by an end pipe 88, a rotary sealed connection 89, and a supply pipe 90. On the back side of some or all of the blades 87 there are provided nozzles 91 supplied by short angled pipes 92 connected with the water supply within the hollow shaft 86. FIG. 1 shows piping and controls, generally designated by the numeral 93, for regulating the supply of water. It is also indicated at 94 that a regulated supply of water may be supplied through the outer cylinder 84 also if desired.

The conveyor 15 is provided with pusher bars 95, a support 96 for the upper span and confining sides 97 for the upper span. The conveyor is separately driven but the driving means is not shown.

FIGS. 2 and 3 show a drive motor M3 which drives the transverse conveyor 17 through a sprocket chain 98 and suitable sprockets.

FIGS. 1 to 4 show the extruding apparatus 19 in partial detail. It is supported on the main framework 40, as on transverse beams 100 (FIG. 4) and the screw feed element 101 thereof is turned by a motor M4 through a sprocket chain 102 and suitable sprockets. The lower end is provided with a perforated plate 103 with holes of suitable size and shape for forming strips of extruded material. As shown in FIGS. 12 and 13 emerging strips are cut into desired length by a transverse wire 104 which is turned around across the lower face of the plate 103. The wire 104 is secured to anchorage elements 105 carried by a rotating ring 106 rotatably supported by rollers 107 operating in an annular groove 108 of the ring. The rollers 107 are supported on shafts 109 carried by brackets 110 rigidly secured to the casing 111 of the pelletizer 19. The ring 106 is provided with a grooved pulley 112 for turning by a V-belt 113 operated by a grooved pulley 114 of a motor M5 anchored on a fixed support.

The pellets formed by the machine 19 drop down on the screen of the lateral transfer device 20. This is a vibratory conveyor screen of the type represented by a market item known as a "Sytron." The broken pieces and fines fall through the screen and into a hopper 117 (FIG. 4) of a return elevating conveyor 118 which conveys the separated material back to the source for re-mixing.

Figure 6:
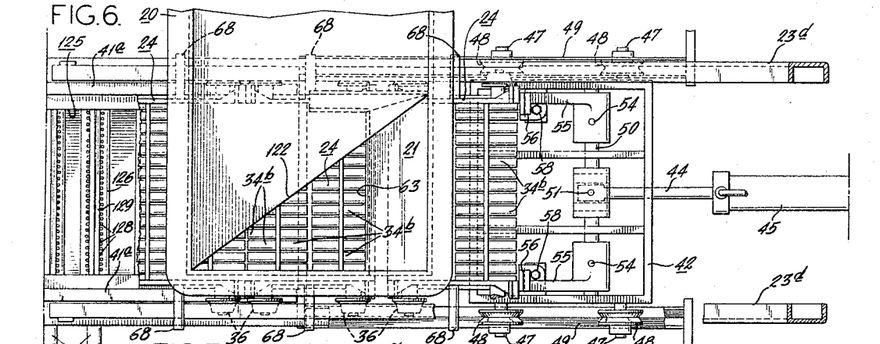
FIG. 6 is a partial horizontal plan and section taken on the broken line 6—6 of FIG. 4.
Figures 7, 8:
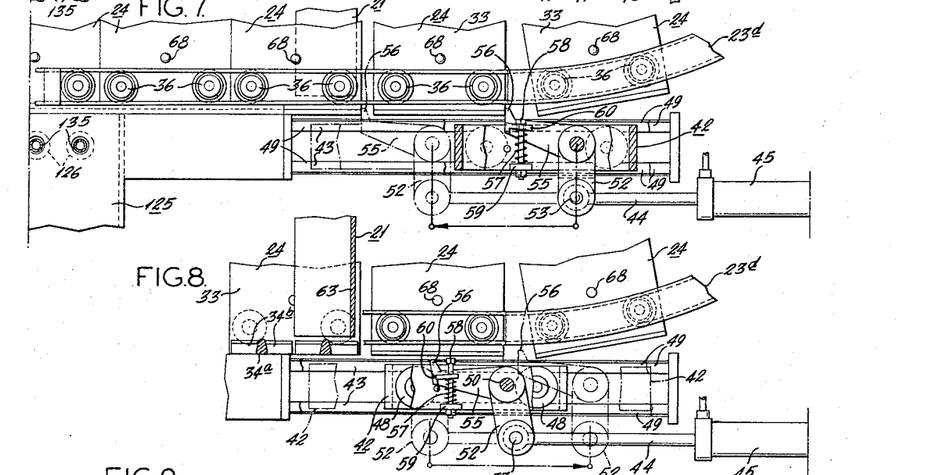
FIG. 7 is a side elevation, partly in section, of parts shown in FIG. 6.
FIG. 8 is a view like FIG. 7 but showing parts in a different position.

The shaker conveyor 20 is operated by a high speed short stroke vibrator motor 120 arranged at the proper angle to give the material an orbital forward movement of very short-length excursions forward along the screen. Flexible supports 121 provide for the necessary movement of the screen conveyor 20. The delivery spout 21, as shown in FIG. 6, has an angular edge 122 to assure that the pellets will be distributed fairly evenly across the width of the pallets halted therebeneath.

Means are provided for igniting the fuel in the lower layer of pellets in the relatively deep bed of 6 inches or more on the grates 34 of the pallets. As shown in FIGS. 20–22, the grates 34 each comprises two or more transverse bars 34a and short longitudinal bars 34b formed integrally with and on opposite sides of the bars 34a. The spaces between bars 34b may be in the order of about ¼ inch if the pellets are of a diameter of about ⅜" to ½".

As shown by the cross-sections of the grate bars 34b shown in FIGURE 22, the grate bars 34b have top portions tapering inwardly and upwardly from a maximum in thickness to zero thickness. Combustion-supporting gas flowing upwardly through the grate is therefore able to permeate uniformly the overlying load of sinterable material, without "dead spots" of incompletely sintered material which would tend to be produced immediately above the grate bars if they were straight-sided and flat on top. Furthermore, the sides of each grate bar extend downwardly from the maximum in thickness, plus producing channels between adjacent grate bars which provide some degree of prewarming of the combustion-supporting gas as it moves upward toward the sinterable material, thus aiding combustion. At the same time the upward flow prevents undue heating of, and consequent damage to the grate members.

As shown in FIGS. 1 and 4, there is provided forward of the charging position, at a distance equal to the length of two pallets, an igniting chamber of box 125 in which are disposed a plurality of spaced burner tubes 126 supported near their ends by horizontal plates 127 of the base frame 41.

Figure 10:
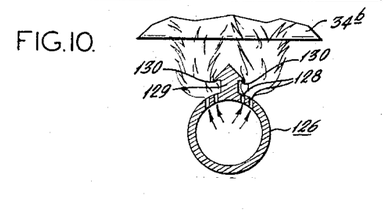
FIG. 10 is a partial enlarged longitudinal section taken on the line 10—10 of FIG. 9.
Figure 11:
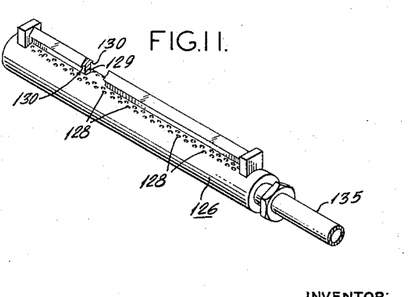
FIG. 11 is a perspective view of a gas burner seen in FIGS. 9 and 10.

The burner tubes are shown in more detail in FIGS. 9, 10 and 11. They are spaced from each other and arranged in parallel transversely across the fire box. Each has a plurality of fuel gas holes 128 on each side of an upstanding central longitudinal rib 129 provided with laterally-extending ribs 130 on the sides forming a cap. This arrangement spreads the flames, as shown in FIG. 10, to avoid upward blasting of the bed of material above the grates and assures reignition if the flame should go out accidentally. As shown in FIG. 1 a gas main 131 and an air main 132 with valved branch pipes 133 and 134, respectively, supply fluid fuel components to mixed fuel supply pipes 135 connected to the burner pipes. A valved branch air pipe 136 supplies additional air directly to the ignition box so that the air therein is under super-atmospheric pressure.

The ignition chamber is defined by spaced transverse partition walls 137, 138 between the longitudinal side wall of the base frame 41. It is disposed beneath the leading end of the hood 27 and since the blowers 30 maintain an updraft in the hood the gases from the combustion chamber will draw off the combustion gases and heat. As the pallets pass over the ignition chamber, air, preheated by the burners 126, passes upwardly through the material in the pallets. In addition, the pellets forming the bottom layer in the grates are heated sequentially by the spaced burners 126. In other words, heat is not continuously applied to the pallets by the burners because of the spacing between the burners. In this way the bottom layer of pallets is heated to a temperature causing the fuel therein to ignite, and combustion is supported by the combustion-supporting gas.

The remainder of the length of the sintering zone is provided with means to supply air under pressure to promote burning upward through the bed. Air is supplied to an elongated plenum chamber 140 and evenly distributed to the enclosed space thereabove 141 below the grate bars by a perforate dividing plate 142.

Longitudinally-spaced transverse ducts 143 and 144 supplied by longitudinal ducts 145 and 146 respectively from a blower 147 provide the supply of pressurized air to the plenum chamber. The branch duct 146 is provided with a regulating valve 148. The blower 147 is driven by a motor M6 through a belt 149, suitable pulleys being provided.

A low pressure box 150 is provided between the preheating chamber or box 125 and the high pressure air space 141, a pipe 151 leading air therefrom to the exhaust hood. The chamber 150 is defined by the transverse wall 138 on one side and a transverse plate 152 on the other side.

Figures 14, 15:
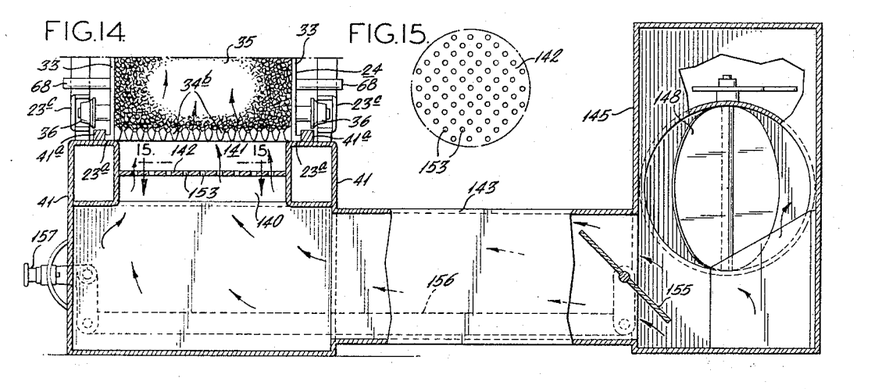
FIG. 14 is an enlarged tranverse partial vertical section taken on the line 14—14 of FIGS. 1 and 2.
FIG. 15 is a plan view of a limited circular portion taken on the line 15—15 of FIG. 14.
Figures 16, 17:
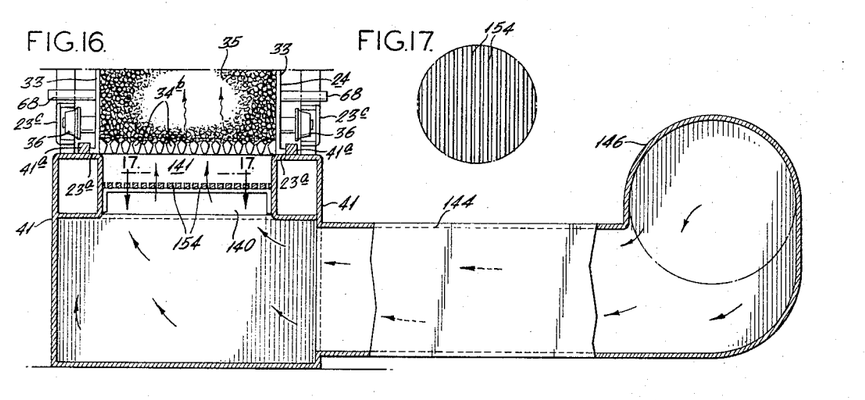
FIG. 16 is an enlarged transverse partial vertical section taken on the line 16—16 of FIGS. 1 and 2.
FIG. 17 is a plan view of a limited circular portion taken on the line 17—17 of FIG. 16.
Figure 18:
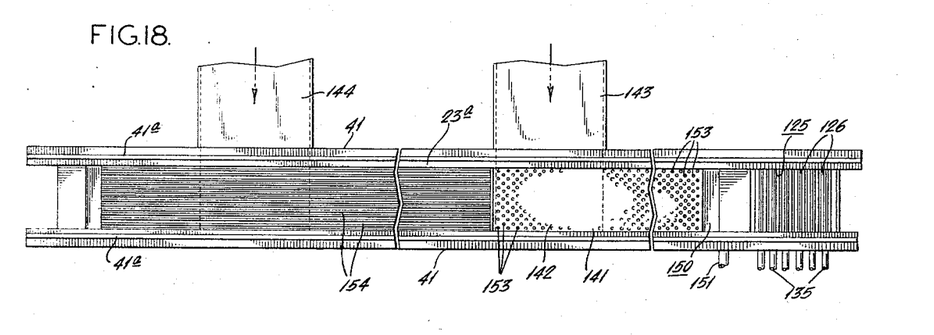
FIG. 18 is an enlarged top plan view taken on the line 18—18 of FIG. 1.

The plate 142 above the part of the plenum chamber 140 served by the supply duct 143, as shown in FIGS. 15 and 18, is preferably provided with relatively small circular holes 153 and beyond, as shown in FIGS. 17 and 18, is provided with longitudinal slots 154. As shown in FIG. 14, a valve 155 is provided in the duct 143, the valve being controlled by linkage generally designated by the numeral 156 from an accessible location by a handle 157.

The upward flow of air thus produced provides the desired upward uniform burning action in the sinterable mass, without requiring further supply of combustible gases. The grate bars which are thereby maintained at a relatively low temperature have long service life even if of relatively lightweight construction.

The apparatus of this invention may be used in the calcining of limestone and in the preparation of cement from limestone, silica and alumina in proper proportions, or from a cement rock containing the proper proportions of silica and alumina in the natural state. In such uses a combustible fuel, such as powdered coal, may be mixed with the raw material prior to sintering.

The apparatus may also be used for quite different heat treatments such as roasting ores, and dead burning of dolomite, and the mechanical features thereof may be used advantageously in connection with treatments not involving heating.

The method and apparatus of this invention are particularly useful in the preparation of shaped bodies for use as aggregate in concrete. Such shaped bodies may be formed from a fine sinterable aggregate body material and fuel for combustion in sintering. Various fine sinterable aggregate body material may be used in this process. Materials screening as fine as 100 to 200 mesh, or finer, may be used. The fine materials capable of use in this process are fly ash, clay, etc. When fly ash is used no additional fuel need be added since it contains sufficient fuel for supporting combustion in the sintering step. When clay is used or materials lacking fuel, it is necessary that granulated solid fuel, such as coal or the like, be added to provide the necessary fuel to carry out the combustion of the sintering process. For example, 6 to 8% of solid fuel added to clay would be sufficient. Shaped bodies, such as pellets, may be formed merely by use of water binder.

The shaped bodies are placed in the pallets and sintered as described in connection with the drawings. Ordinarily the bottom layers will reach a temperature of about 1200° F. at the time of initial ignition. As combustion continues upwardly through the mass the temperature of the bodies increases to about 1800 to 1900° F., at which sintering takes place. The resulting sintered bodies can be easily separated one from the other.

An example of use of the above-described apparatus the material sintered was in the form of the pellets comprising fly ash and water binder. The sintered product constituted a light-weight aggregate suitable for use in concrete. The composition of the fly ash was as follows.

| Material: | Percent by wt. |
| --- | --- |
| $SiO_2$ | 36.6 |
| $Al_2O_3$ | 23.1 |
| $Fe_2O_3$ | 22.7 |
| $CaO$ | 7.1 |
| $MgO$ | 1.0 |
| $SO_3$ | 1.2 |
| Free $H_2O$ | 0.3 |
| Volatiles | 6.2 |

Sintering was at about 1800° F., while the temperature of the grate members did not exceed about 1000° F.

While the invention has been described with particular reference to specific embodiments thereof, it may be embodied in many other forms without departing from the spirit and scope of the invention as defined by the appended claims.

What is claimed is:

1. Apparatus for treating a mass of solid particles, comprising a plurality of independent, disconnected pallets each having sides, open ends and a perforate bottom, endless track means having a lower run for supporting a train of said pallets in end-abutting relation to each other between a first and a second position and an upper run for receiving pallets from said lower run and for returning them in sequence to the rear of said train, a train of said pallets extending between said first and second positions and being shorter in length than said endless track means whereby said train does not extend into that portion of said track means through which pallets are elevated from said lower run to said upper run, means for loading said pallets in said train at said first position with a mass of solid particles to be treated, means for treating said mass of solid particles in said pallets while said pallets are moving from said first position to said second position in said train, lifting means operable to engage and separate from said train the leading pallet upon reaching said second position, to tilt said separated pallet to remove treated material therefrom, and to lift and deliver to said upper run of said track said separated pallet, thereby to return in sequence each such separated pallet into end-abutting relation with the rear of said train to maintain a continuous train of end-abutting pallet members between said first and second positions, and driving apparatus for engaging and urging forward each of said pallets in sequence when it has been returned into said end-abutting position at the rear of said train, thereby to advance said train toward said second position.

2. Apparatus according to claim 1 including means for activating said lifting means when the leading pallet of said train reaches said second position.

3. Apparatus for treating a mass of solid particles, comprising a plurality of independent, disconnected pallets each having sides, open ends and a perforate bottom, endless track means having a lower run for supporting a train of said pallets in end-abutting relation to each other between a first and a second position and an upper run for receiving pallets from said lower run and for returning them in sequence to the rear of said train, means for loading said pallets in said train at said first position with a mass of solid particles to be treated, means for treating said mass of solid particles in said pallets while said pallets are moving from said first position to said second position in said train, lifting means comprising a pair of rotatably mounted arms operable during each rotation thereof to engage and separate from said train the leading pallet upon reaching said second position, to tilt said pallet to remove treated material therefrom, and to lift and deliver to said upper run of said track said separated pallet, thereby to return in sequence each such separated pallet into end-abutting relation with the rear of said train to maintain a continuous train of end-abutting pallet members between said first and second positions, means for rotating said arms, and driving apparatus for engaging and urging forward each of said pallets in sequence when it has been returned into said end-abutting position at the rear of said train, thereby to advance said train toward said second position.

4. Apparatus according to claim 3 including means operable when contacted with the leading pallet of said train upon reaching said second position to activate said means for rotating said arms, and means operable when contacted with said arms during rotation thereof to deactivate said means for rotating said arms.

5. Apparatus according to claim 1 including means for advancing said separated pallets along said upper run of said track.

6. Apparatus according to claim 1 in which said driving apparatus comprises a reciprocating element for engaging and urging forward successive ones of said returned pallet members during successive reciprocatory strokes of said member in a given direction.

7. Apparatus according to claim 1 in which each of said perforate bottoms of said pallets comprises adjacent, spaced grate members each having top portions tapered upwardly toward said mass from a maximum dimension thereof and having other portions extending downwardly from said maximum dimension.

8. Apparatus according to claim 7 in which said downwardly extending portions of said grate members are tapered inwardly from said maximum dimension thereof.

9. Apparatus in accordance with claim 1 in which said means for treating said mass of discrete bodies in said pallets comprises means to ignite combustible matter in the mass of solid material forming the lowest layers of said mass, and means for supplying a combustion-supporting gas under pressure to the underside of said grate members of said pallets of said train after they have moved away from said ignition means but before they reach said second position, whereby uniform upward burning of combustible matter in said mass of solid material is obtained.

10. Apparatus according to claim 9 wherein said ignition means comprises a plurality of burners for gaseous fuel located in spaced relation along the lower run of said track beneath said train of said pallets, means for delivering gaseous fuel to said burners and means for delivering a combustion-supporting gas to the underside of said pallets as they pass over said burners, whereby the fuel in the material comprising the bottom layers in each of said pallets is ignited by alternate contact with heat from said burners and combustion-supporting gas.

11. Apparatus according to claim 9 wherein said ignition means comprises means for periodically heating the lowest layers of said mass, and means for delivering a combustion-supporting gas to the underside of said pallets, whereby the fuel in the material comprising the bottom layers in each of said pallets is ignited by alternate contact with heat and combustion-supporting gas.

12. A method of heat treating a solid material containing fuel for combustion during said heat treatment comprising placing a mass of said solid material and fuel for combustion in a receptacle having a perforate bottom, igniting the fuel in the bottom layers of said material by periodically heating said bottom layers and by supplying upwardly through said perforate bottom of said receptacle a combustion-supporting gas, and thereafter discontinuing application of heat to said bottom layers while continuing to supply combustion-supporting gas upwardly through the perforate bottom of said receptacle thereby causing combustion of the fuel in said material to progress upwardly through said mass of material.

13. The method according to claim 12 in which said heat is supplied by combustion of a gaseous fuel.

14. The method according to claim 12 in which said material to be heat treated is in the form of discrete shaped bodies comprising a sinterable aggregate body material and fuel for combustion.

15. The method according to claim 14 in which said shaped bodies comprise fly ash.

16. The method according to claim 14 in which said shaped bodies comprise a mixture of fly ash and clay.

References Cited

UNITED STATES PATENTS

| | | | |
|---|---|---|---|
| 916,393 | 3/1909 | Dwight et al. | 266—21 |
| 916,397 | 3/1909 | Dwight | 266—21 X |
| 1,206,397 | 11/1916 | Yost et al. | 266—21 |
| 1,471,402 | 10/1923 | Lloyd | 266—21 |
| 1,704,681 | 3/1929 | Greenawalt | 266—21 |
| 1,934,986 | 11/1933 | Magee | 266—21 |
| 2,005,082 | 6/1935 | Greenawalt | 266—21 |
| 2,245,136 | 6/1941 | Shallock | 266—21 |
| 2,506,569 | 5/1950 | Agnew | 266—21 |
| 3,066,031 | 11/1962 | Schifferle | 263—53 |
| 3,203,761 | 8/1965 | Neuville | 263—53 X |

FREDERICK L. MATESON, JR., *Primary Examiner.*

JOHN J. CAMBY, *Examiner.*